United States Patent
Wood et al.

(10) Patent No.: US 9,483,449 B1
(45) Date of Patent: Nov. 1, 2016

(54) OPTIMIZING PAGE OUTPUT THROUGH RUN-TIME REORDERING OF PAGE CONTENT

(75) Inventors: Jeffrey D. Wood, Seattle, WA (US); Diwakar Chakravarthy, Kirkland, WA (US)

(73) Assignee: Amazon Technologies, Inc., Seattle, WA (US)

( * ) Notice: Subject to any disclaimer, the term of this patent is extended or adjusted under 35 U.S.C. 154(b) by 854 days.

(21) Appl. No.: 12/846,949

(22) Filed: Jul. 30, 2010

(51) Int. Cl.
*G06F 17/00* (2006.01)
*G06F 17/22* (2006.01)
*G06F 17/30* (2006.01)

(52) U.S. Cl.
CPC ..... *G06F 17/2247* (2013.01); *G06F 17/30899* (2013.01)

(58) Field of Classification Search
CPC ...................... G06F 17/2247; G06F 17/30899
USPC .................................................. 715/234, 240
See application file for complete search history.

(56) References Cited

U.S. PATENT DOCUMENTS

| | | | |
|---|---|---|---|
| 5,987,466 A * | 11/1999 | Greer et al. | |
| 6,657,647 B1 * | 12/2003 | Bright | 715/856 |
| 7,331,038 B1 * | 2/2008 | Snodgrass | G06F 17/30893 715/751 |
| 8,103,742 B1 * | 1/2012 | Green | G06F 17/30893 709/218 |
| 8,751,925 B1 * | 6/2014 | Zhang et al. | 715/241 |
| 2001/0044809 A1 * | 11/2001 | Parasnis et al. | 707/513 |
| 2003/0137538 A1 * | 7/2003 | Hesmer et al. | 345/760 |
| 2004/0255003 A1 * | 12/2004 | Tecu et al. | 709/217 |
| 2004/0268231 A1 * | 12/2004 | Tunning | 715/513 |
| 2005/0187978 A1 * | 8/2005 | Qian et al. | 707/104.1 |
| 2006/0005137 A1 * | 1/2006 | Jolley | 715/742 |
| 2006/0047728 A1 * | 3/2006 | Kim et al. | 707/205 |
| 2008/0028302 A1 * | 1/2008 | Meschkat | 715/255 |
| 2008/0133722 A1 * | 6/2008 | Ramasundaram et al. | 709/222 |
| 2008/0301314 A1 * | 12/2008 | Paila | H04L 29/06027 709/231 |
| 2009/0063499 A1 * | 3/2009 | Koinuma | G06F 17/30902 |
| 2009/0113282 A1 * | 4/2009 | Schultz et al. | 715/208 |
| 2010/0057830 A1 * | 3/2010 | Takala | H04W 4/02 709/203 |
| 2011/0078703 A1 * | 3/2011 | Dokovski et al. | 719/315 |
| 2011/0145364 A1 * | 6/2011 | Joyce et al. | 709/219 |

OTHER PUBLICATIONS

U.S. Appl. No. 12/240,926, filed Sep. 29, 2008, "Managing Network Data Display".

* cited by examiner

*Primary Examiner* — Scott Baderman
*Assistant Examiner* — Howard Cortes
(74) *Attorney, Agent, or Firm* — Lee & Hayes, PLLC

(57) ABSTRACT

Technologies are described herein for optimizing page output by performing run-time reordering of the content of a page. A request for a content page is received from a client application. A page layout corresponding to the requested content page is transmitted to the client application. The page layout contains a number of placeholder elements corresponding to the content sections of the content page arranged in a particular layout. Upon receiving the page layout, the client application renders the content page to the display with the placeholder elements occupying the positions of the content sections. The content sections corresponding to the placeholder elements are generated and transmitted to the client application in an order independent of the order of rendering of the content sections. As the client application receives each content section, the corresponding placeholder element in the page layout is replaced with the content section.

23 Claims, 6 Drawing Sheets

```
<HTML>
  <BODY>
    <DIV ID='CONTENT'>
      <DIV ID='HEADER'>                                    302A
        <DIV ID='HEADER_PLACEHOLDER' CLASS="HIDE"/>
      </DIV>
      <DIV ID='BODY'>
        <DIV ID='LEFT_COLUMN'>                             302B
          <DIV ID='LEFT_COLUMN_CONTENT1_PLACEHOLDER' CLASS='HIDE'/>  302C
          <DIV ID='LEFT_COLUMN_CONTENT2_PLACEHOLDER' CLASS='HIDE'>
        </DIV>
        <DIV ID='CENTER_COLUMN'>                           302D
          <DIV ID='CENTER_COLUMN_CONTENT1_PLACEHOLDER' CLASS='HIDE'/>
          <DIV ID='CENTER_COLUMN_CONTENT2_PLACEHOLDER' CLASS='HIDE'/>
        </DIV>                                             302F  302E
        <DIV ID='RIGHT_COLUMN'>
          <DIV ID='RIGHT_COLUMN_CONTENT1_PLACEHOLDER' CLASS='HIDE'/>
          <DIV ID='RIGHT_COLUMN_CONTENT2_PLACEHOLDER' CLASS='HIDE'/>
        </DIV>
                                                           302G
      </DIV>
      <DIV ID='FOOTER'>          302H
        <DIV ID='FOOTER_PLACEHOLDER'/>
      </DIV>
    </DIV>

<SCRIPT TYPE='TEXT/JAVASCRIPT'>
      FUNCTION MOVEIT( PARENT_ID, SRC_ID, DEST_ID ) {
        SRC = DOCUMENT.GETELEMENTBYID( SRC_ID );
        DST = DOCUMENT.GETELEMENTBYID( DEST_ID );
        DOCUMENT.GETELEMENTBYID( PARENT_ID ).REPLACECHILD( SRC, DST );
      }
    </SCRIPT>
      ⋮
    <DIV ID='FOOTER_CONTENT'>
      FOOTER CONTENT
    </DIV>
    <SCRIPT TYPE='TEXT/JAVASCRIPT'>
      MOVEIT( 'FOOTER', 'FOOTER_CONTENT', 'FOOTER_PLACEHOLDER' );
    </SCRIPT>
  ⋮        ⋮
```

*FIG. 3A*

```
                ⋮
       ┌  <DIV ID='HEADER_CONTENT'>
       │     HEADER CONTENT
       │  </DIV>
  132B ┤  <SCRIPT TYPE='TEXT/JAVASCRIPT'>
       │     MOVEIT( 'HEADER', 'HEADER_CONTENT', 'HEADER_PLACEHOLDER' );
       └  </SCRIPT>
                ⋮
       ┌  <DIV ID='LEFT_COLUMN_CONTENT1'>
       │     LEFT CONTENT 1
       │  </DIV>
  132C ┤  <SCRIPT TYPE='TEXT/JAVASCRIPT'>
       │     MOVEIT( 'LEFT_COLUMN', 'LEFT_COLUMN_CONTENT1',
       │             'LEFT_COLUMN_CONTENT1_PLACEHOLDER');
       └  </SCRIPT>
                ⋮
110                                                                 
       ┌  <DIV ID='CENTER_COLUMN_CONTENT2'>
       │     CENTER CONTENT 2
       │  </DIV>
  132D ┤  <SCRIPT TYPE='TEXT/JAVASCRIPT'>
       │     MOVEIT( 'CENTER_COLUMN', 'CENTER_COLUMN_CONTENT2',
       │             'CENTER_COLUMN_CONTENT2_PLACEHOLDER' );
       └  </SCRIPT>
                ⋮
       ┌  <DIV ID='LEFT_COLUMN_CONTENT2'>
       │     LEFT CONTENT 2
       │  </DIV>
  132N ┤  <SCRIPT TYPE='TEXT/JAVASCRIPT'>
       │     MOVEIT( 'LEFT_COLUMN', 'LEFT_COLUMN_CONTENT2',
       │             'LEFT_COLUMN_CONTENT2_PLACEHOLDER' );
       └  </SCRIPT>
          </BODY>
          </HTML>
```

*FIG. 3B*

OPTIMIZING PAGE OUTPUT THROUGH RUN-TIME REORDERING OF PAGE CONTENT

BACKGROUND

A content provider may make a variety of informational content available online, such as product details, reference information, news, commentary, advertisements, and the like. The content provider may provide the content through a Web site or other information service available to users over a network, such as the Internet. The users may utilize a client application, such as a Web browser, executing on a user computing device to access the content information from the content provider.

The content may be presented to the client application as a "page" of information. The page may contain text, pictures, video, interactive user interface components, and the like. The information in the page is rendered to a display or other output device by the client application for presentation to the user. The page may be further divided into content sections containing specific types of information. For example, a typical Web page for a product offered for sale by an online merchant may contain a header section identifying the product; a left column section containing navigation information for the product information; center sections containing a product description, specifications, pictures, and other product details; a right column section containing purchase information or a purchase button for the product; and a footer section containing merchant identification, contact, and legal information.

The content sections in the page may be provided to the client application as a series of instructions for rendering the information to the display. For example, the content page may consist of a markup language, such as hypertext markup language ("HTML") utilized for the presentation of Web pages. Client applications generally render the information described in the markup language in the order of its presentation on the page, from the top to the bottom. Consequentially, the content provider provides the markup language describing the content sections of the page to the client application in the order of the rendering of the sections. However, the nature of the content may require a considerable amount of time for the information service of the content provider to produce and/or transmit certain content sections of the page, delaying the display of other sections of information that are more readily available. The delays resulting from the generation and/or transmission of the larger or more complex content sections may result in longer page rendering times along with inefficient use of content generation resources and network bandwidth.

It is with respect to these and other considerations that the disclosure made herein is presented.

BRIEF DESCRIPTION OF THE DRAWINGS

FIGS. 3A and 3B are a code listing of illustrative markup language describing the content sections of the page, according to embodiments presented herein;

DETAILED DESCRIPTION

Figure 1:
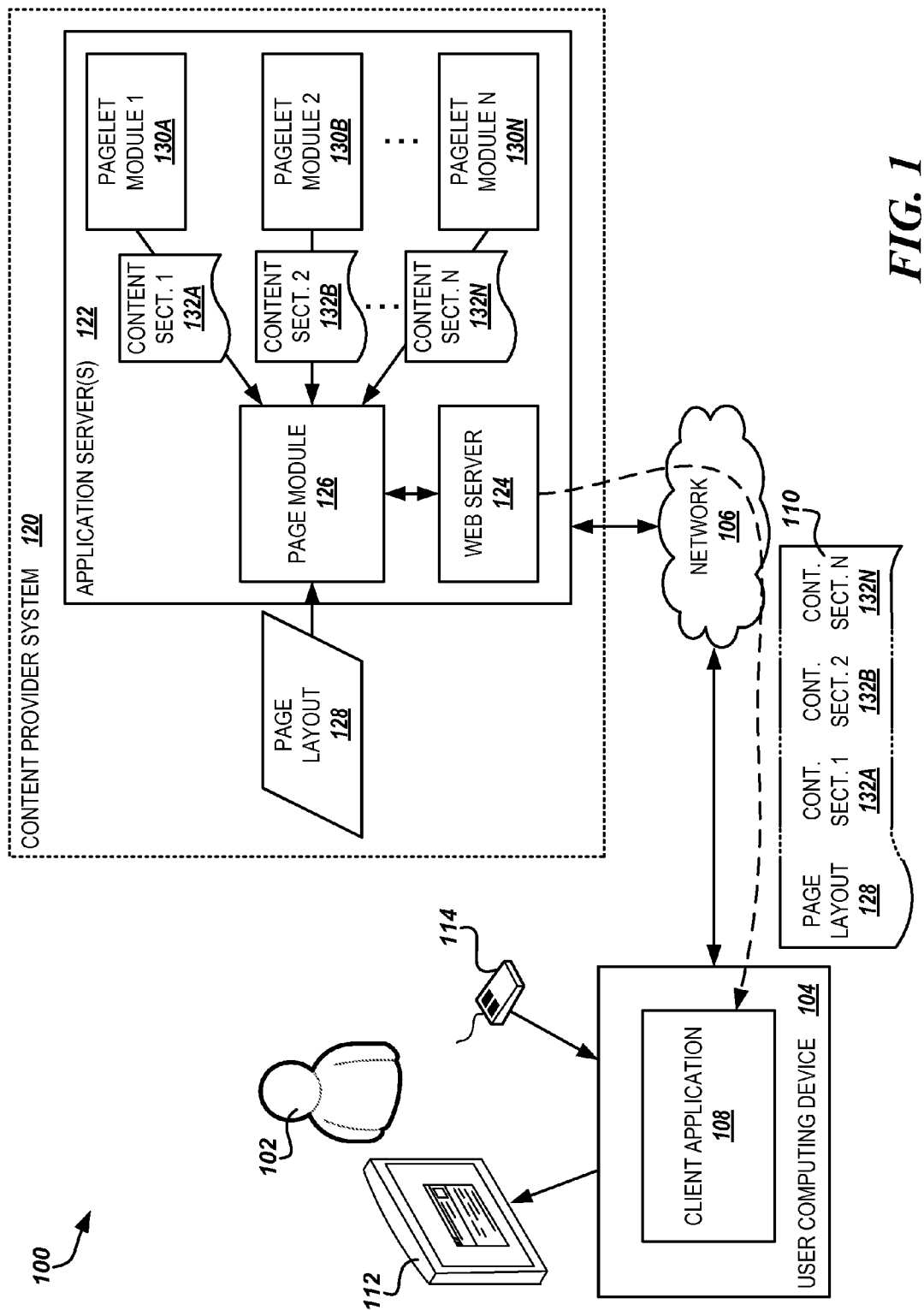
FIG. 1 is a system diagram showing aspects of an illustrative operating environment for optimizing page output by performing run-time reordering of the content of a page, including several software and hardware components provided by embodiments presented herein.

The following detailed description is directed to technologies for optimizing page output by performing run-time reordering of the content of a page. Utilizing the technologies described herein, a content page that includes a number of content sections may be generated on a server and transmitted to a client application in an order independent of the order of rendering of the content sections by the client application for display to a user. This allows the priority and order of generation of the content sections on the server to be adjusted, while still allowing the client application to render the content page in the intended format. In this way, higher priority content sections or those readily available may be displayed to the user without having to wait for lower priority content sections or those requiring more time to generate. This may result in faster overall page rendering times as well as more efficient resource usage for content generation and network bandwidth usage for transmission of the content to the client application.

According to embodiments, a request for a content page is received from a client application. A page layout corresponding to the requested content page is transmitted to the client application. The page layout contains a number of placeholder elements corresponding to the content sections of the content page arranged in a particular layout. Upon receiving the page layout, the client application renders the content page to the display with the placeholder elements occupying the positions of the content sections. The content sections corresponding to the placeholder elements are then generated and transmitted to the client application in an order independent of the order of rendering of the content sections to the display. As the client application receives each complete content section, the corresponding placeholder element in the page layout is replaced with the content section.

It should be appreciated that the subject matter presented herein may be implemented as computer process, a computer-controlled apparatus, a computing system, or an article of manufacture, such as a computer-readable storage medium. These and various other features will become apparent from a reading of the following disclosure and a review of the associated drawings.

While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced on or in conjunction with other computer system configurations beyond those described below, including multiprocessor systems, microprocessor-based or programmable consumer electronics, minicomputers, mainframe computers, handheld computers, personal digital assistants, cellular telephone devices, electronic-book readers, special-purposed hardware devices, network appliances, and the like. The embodiments described herein may also be practiced in distributed computing environments, where tasks are performed by remote processing devices that are linked through a communications network. In a distributed computing environment, program modules may be located in both local and remote memory storage devices.

In the following detailed description, references are made to the accompanying drawings that form a part hereof, and that show, by way of illustration, specific embodiments or examples. The drawings herein are not drawn to scale. Like numerals represent like elements throughout the several figures.

FIG. 1 and the following description are intended to provide a brief, general description of a suitable computing environment in which the embodiments described herein may be implemented. In particular, FIG. 1 is a system diagram that shows an illustrative operating environment 100 including several software components for implementing methods for optimizing page output by performing run-time reordering of the content of a page, according to embodiments provided herein. The environment 100 includes a user 102 that uses a user computing device 104 to access a content provider system 120 across a network 106. The user 102 may be an individual or entity that desires to access information provided by the content provider. The user computing device 104 may be a personal computer ("PC"), a desktop workstation, a laptop, a notebook, a personal digital assistant ("PDA"), a wireless device, a cellular telephone, an electronic-book reader, a game console, a set-top box, a consumer electronics device, a server computer, or any other computing device capable of connecting to the network 106 and communicating with the content provider system 120.

The network 106 may be a local-area network ("LAN"), a wide-area network ("WAN"), the Internet, or any other networking topology known in the art that connects the user computing device 104 to the content provider system 120. The content provider system 120 may include a number of application servers 122 that provide various information services to the user computing device 104 over the network 106. The user 102 may use a client application 108 executing on the user computing device 104 to access and utilize the information services provided by the application servers 122.

According to one embodiment, the client application 108 may be a Web browser application, such as the MOZILLA® FIREFOX® Web browser from Mozilla Foundation of Mountain View, Calif. The Web browser application exchanges data with the application servers 122 in the content provider system 120 using the hypertext transfer protocol ("HTTP") over the network 106. Alternatively, the client application 108 may utilize any number of communication methods known in the art to communicate with the content provider system 120 and/or the application servers 122 across the network 106, including remote procedure calls, SOAP-based Web services, remote file access, proprietary client-server architectures, and the like.

The application servers 122 may execute a number of modules in order to provide the information services to the client application 108. The modules may execute on a single application server 122 or in parallel across multiple application servers in the content provider system 120. In addition, each module may consist of a number of subcomponents executing on different application servers 122 or other computing devices in the content provider system 120. The modules may be implemented as software, hardware, or any combination of the two.

In one embodiment, a Web server 124 or other information service module executes on the application servers 122. The Web server 124 retrieves information requested by the client application 108, compiles a content page 110 containing the information, and transmits the content page over the network 106 to the client application for display to the user 102. The content page 110 may be a Web page consisting of hypertext markup language ("HTML"), extensible markup language ("XML"), and/or scripting-language code that contains the requested information along with instructions regarding how the content page is to be rendered by the client application 108, for example.

The client application 108 may receive the content page 110 from the Web server 124 and display the included information to the user 102 on a display 112 connected to the user computing device 104. In addition, the client application 108 may allow the user 102 to interact with the display of the content page 110, using a number of input devices connected to the user computing device 104, such as the mouse 114 shown in FIG. 1. It will be appreciated that any number of methods and technologies may be utilized that allow the Web server 124 to encode the requested information in the content page 110 and send the content page to the client application 108 for display to the user 102. It is intended that all such methods and technologies be included within the scope of this application.

According to one embodiment, the Web server 124 utilizes a page module 126 to compile the requested content page 110. Each page module 126 in the content provider system 120 contains instructions for compiling a specific content page 110. The Web server 124 may determine the page module 126 for compilation of the requested content page 110 from an identifier or address included in the request from the client application 108, for example. The page module 126 first retrieves a page layout 128 corresponding to the requested content page 110. The page layout 128 defines the content page 110 as a set of named layout sections that are to be filled with corresponding content, as will be described below in regard to FIGS. 3A-3B. The page layout 128 is returned to the Web server 124, which adds the page layout to the output stream as part of the requested content page 110 being transmitted to the client application 108.

The page module 126 then executes one or more pagelet modules 130A-130N (referred to herein generally as pagelet module 130) based on the layout sections defined in the page layout 128. Each pagelet module 130 is responsible for generating a content section 132A-132N (referred to herein generally as content section 132) containing the actual content to fill the corresponding named layout section in the page layout 128. As will be described in more detail below in regard to FIG. 4, the pagelet modules 130 needed to generate the content sections 132 for the requested content page 110 may be executed sequentially based on a priority order, simultaneously across multiple application threads, or in batches of a predetermined number based on resource requirements.

As each pagelet module 130 completes and returns the corresponding content section 132, the page module 126 forwards the content section to the Web server 124, which adds the content to the output stream as part of the requested content page 110 being transmitted to the client application 108. It will be appreciated that the order in which the content sections 132 are generated may vary depending on the order of execution of the corresponding pagelet modules 130, the processing and data acquisition resources required to generate the content sections, the available resources on the application servers 122, and the like. As will become apparent below, the embodiments described herein allow the content page 110 to be rendered in desired fashion by the client application 108 regardless of the order in which the content sections 132 are transmitted by the Web server 124.

Figure 2A:
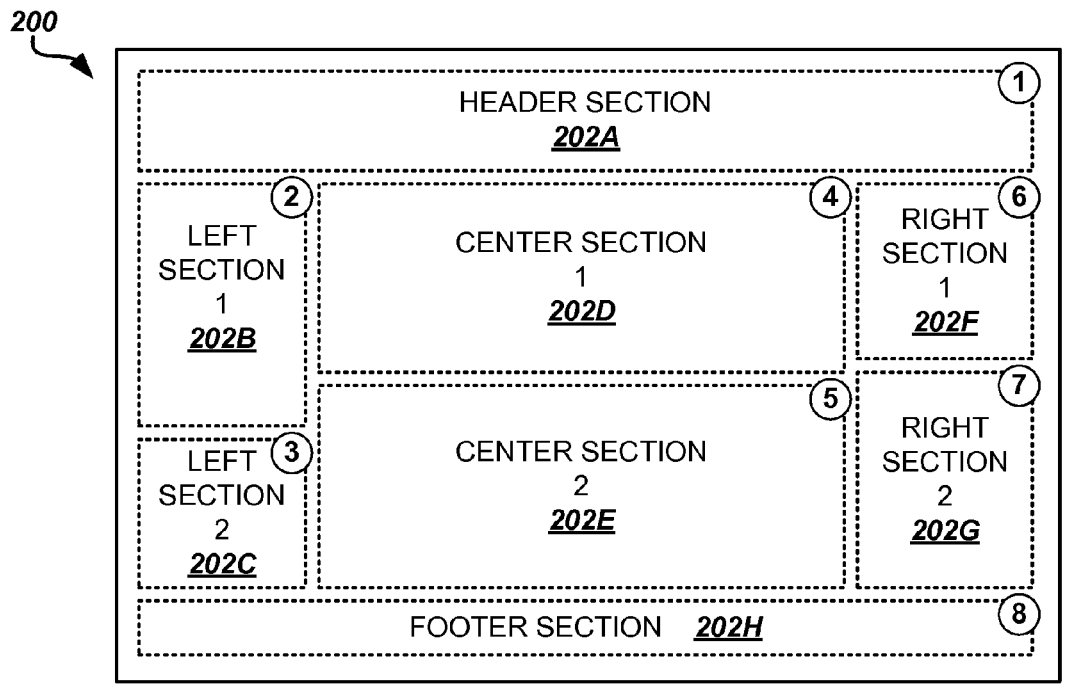
FIGS. 2A and 2B are block diagrams showing illustrative content sections of a page along with ordering of the rendering and/or transmission of the content sections, according to embodiments presented herein.

FIG. 2A is a block diagram showing an illustrative layout 200 of a content page 110 as rendered by the client application 108 to the display 112. The layout 200 comprises a number of layout sections 202A-202H arranged at various positions within the rendered display. Each layout section 202A-202H is utilized to show a corresponding content section 132 received from the Web server 124 as part of the content page 110. The layout sections 202A-202H may be arranged as rows and columns in nested tables, as shown in FIG. 2A, as overlapping regions, as a text flow (e.g. from left to right and top to bottom), or in any other arrangement or format known in the art. The name, position, and format of each of the layout sections 202A-202H in the layout 200 is defined by the page layout 128 received by the client application 108 in the first part of the content page 110.

FIG. 2A further shows the sequential order in which the layout sections 202A-202H are rendered by the client application 108 in rendering the content page 110 to the display 112, indicated by the ordinal numbers in the top-right corner of each layout section. For example, the client application 108 may first render the header section 202A to the display 112, then the two left sections 202B and 202C, the two center sections 202D and 202E, the two right sections 202F and 202G, and finally the footer section 202H. The order of rendering of the layout sections 202A-202H may depend on the format and arrangement of the sections in the layout 200, the markup language comprising the page layout 128, the type of client application 108 rendering the content page, and/or other factors.

Figure 2B:
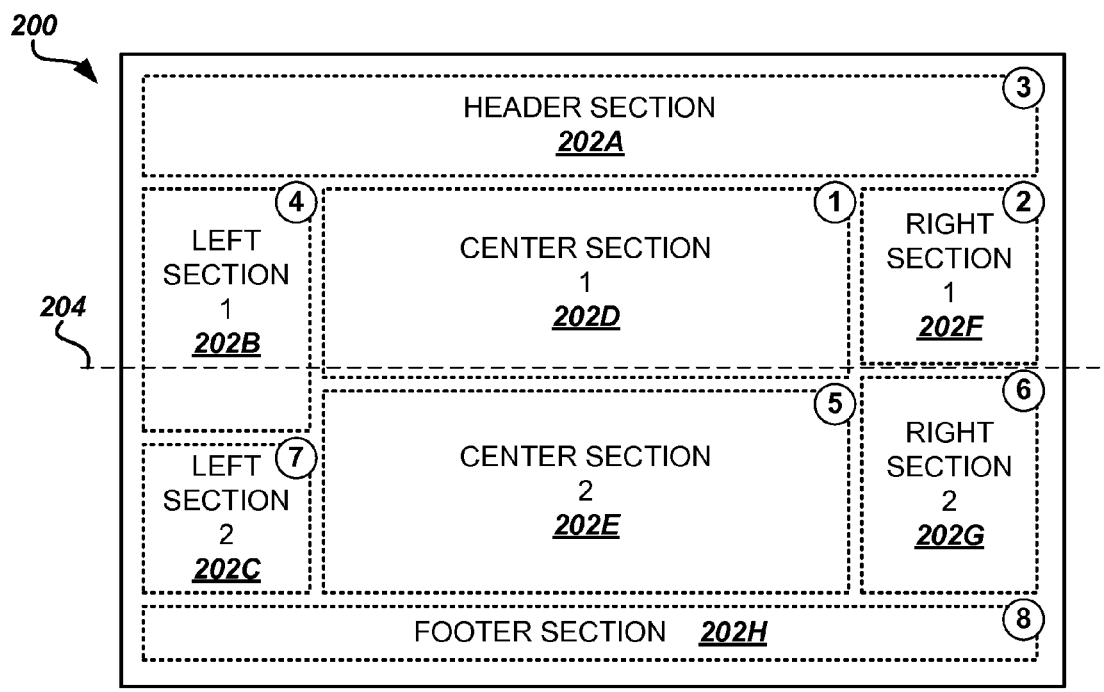

As described above, the content sections 132A-132N, each containing the content for a corresponding layout section 202A-202H, may be received by the client application 108 in the output stream from the Web server 124 in an order different from the order of rendering of the layout sections described above. For example, content sections 132 corresponding to the layout sections 202A-202H may be received by the client application 108 in the order indicated in FIG. 2B. In one embodiment, the order in which the content sections 132 are received by the client application 108 depends on the order of execution of the corresponding pagelet modules 130 by the page module 126 described above in regard to FIG. 1. For example, the page module 126 may prioritize the execution of pagelet modules 130 generating content sections 132 that provide content for layout sections 202A, 202B, 202D, and 202F that are "above the fold," i.e. those that will be shown in the initial display of the content page 110, indicated by line 204 in the figure, when the entire contents of the page are larger than the display area of the display 112. In one embodiment, those layout sections 202A, 202B, 202D, and 202F that are above the fold in a particular content page 110 may be identified from display-order information and other performance metrics collected from client applications 108 in past renderings of the page, as described in co-pending U.S. patent application Ser. No. 12/240,926 filed Sep. 29, 2008, and entitled "Managing Network Data Display," which is by this reference incorporated herein in its entirety.

In another embodiment, the page module 126 may utilize the display-order information and other performance metrics collected from client applications 108 to determine the execution order of the pagelet modules 130 according to some other priority or optimization approach. In a further embodiment, the order in which the content sections 132 are received by the client application 108 depends on the processing and data acquisition resources required to generate each content section, with larger and more complex content sections taking longer to generate by the corresponding pagelet module 130 and to transmit to the client application. It will be appreciated that the order in which the content sections 132 corresponding to the layout sections 202A-202H of the content page 110 are received by the client application 108 may depend on other factors beyond those described herein.

As will be described in more detail below, the content page 110 is rendered by the client application 108 to the display 112 upon receiving the page layout 128, with placeholders occupying each layout section 202A-202H in the page layout 200. As each content section 132 is subsequently received by the client application 108, the placeholder occupying the corresponding layout section 202A-202H is replaced with, or "filled-in" from, the content section, so that the content is displayed in the proper position and format within the layout 200. In this way, the content page 110 may be rendered to the display 112 with the proper layout 200 regardless of the order in which the content sections 132 corresponding to the various layout sections 202A-202H are received by the client application 108. In one embodiment, the client application 108 may wait for a number of content sections 132 to be received before replacing the corresponding layout sections 202A-202H with the content. This may be done to reduce the "screen flicker" that may occur when replacing the content of a layout section 202A-202H already rendered to the display 112.

FIGS. 3A and 3B provide a code listing 300 from an example content page 110 comprising markup language generated by the page module 126 and associated pagelet modules 130A-130N and transmitted by the Web server 124 to the client application 108, according to embodiments described herein. In one embodiment, the content page 110 may consist of HTML, as shown in the figures. The first portion of the content page 110 includes the page layout 128, which consists of markup language defining the position and format of the various layout sections 202A-202H in the layout 200 of the content page. Each layout section 202A-202H has a corresponding named placeholder element 302A-302H defined in the page layout 128.

The placeholder elements 302A-302H may consist of DIV tags or other element types in the HTML code listing 300, and each may contain an ID attribute identifying the corresponding layout section 202A-202H, for example. It will be appreciated that the format and position of each placeholder element 302A-302H corresponding to a layout section 202A-202H within the content page 110 may be determined by cascading style sheet ("CSS") style definitions, additional HTML in the page layout 128, or by some other method known in the art. As described above, upon receiving the page layout 128 portion of the content page 110, the client application 108 may render the content page to the display 112 with the placeholder elements 302A-302H in place of the content of the various layout sections 202A-202H.

The page layout 128 portion of the content page 110 may also contain scripting-language code, such as the scripting-language code 304 shown in FIG. 3A, that is utilized by the client application 108 in rendering the content page. According to one embodiment, the scripting-language code 304 contains a function utilized by the client application 108 to replace the placeholder elements 302A-302H defined in the page layout 128 with the contents of the corresponding content sections 132 once the content sections are received from the page module 126 through the Web server 124. The function may utilize a standard method from the application program interface ("API") provided by the document object model ("DOM") implemented by the Web browser applications, for example. The API method may allow the client application 108 to replace the child elements of the placeholder elements 302A-302H in the DOM with the elements comprising the content section 132, as will be described below.

Following the page layout 128 in the content page 110, the client application receives the content sections 132A-132N corresponding to layout sections 202A-202H described above. The content sections 132 consist of markup language defining the contents for the corresponding layout section 202A-202H. As further described above, the content sections 132A-132N may be received in a random order, depending on the methodology used by the page module 126 in executing the pagelet modules 130, the amount of time required by each pagelet module 130 to generate the content section 132, and the like. For example, the first content section 132A received by the client application 108 may contain content for the footer section 202H defined in the layout 200 described in FIG. 2A.

Each content section 132 may further contain scripting-language code to execute the function described above for replacing the corresponding placeholder element 302A-302H defined in the page layout 128 with the content section. For example, the content section 132A corresponding to the footer section 202H shown in FIG. 3A may contain a call to the function to replace placeholder element 302H corresponding to the footer section 202H with the content section. Once the content section 132A is fully received by the client application 108 and rendered into the DOM, the client application may then execute the scripting-language code to call the function and replace the child elements of the placeholder element 302H in the DOM with the elements comprising the fully rendered content section.

According to one embodiment, the markup language in each of the content sections 132 may specify that the content is initially hidden as it is rendered by the client application 108 to the DOM, through CSS styles, HTML attributes, or some other method known in the art. The scripting-language code included with the content section 132 may further contain instructions to show the content once the corresponding placeholder element 302A-302H has been replaced with the content section. Subsequent content sections 132B-132N received by the client application 108, as shown in FIG. 3B, are rendered to the DOM and then the corresponding placeholder elements 302A-302G defined in the page layout 128 are replaced with the elements comprising the content sections in the manner are described above. After the last content section 132N, the content page 110 may contain additional markup language signaling the end of the rendering of the content page to the client application 108, as further shown in the figure.

Figure 4:
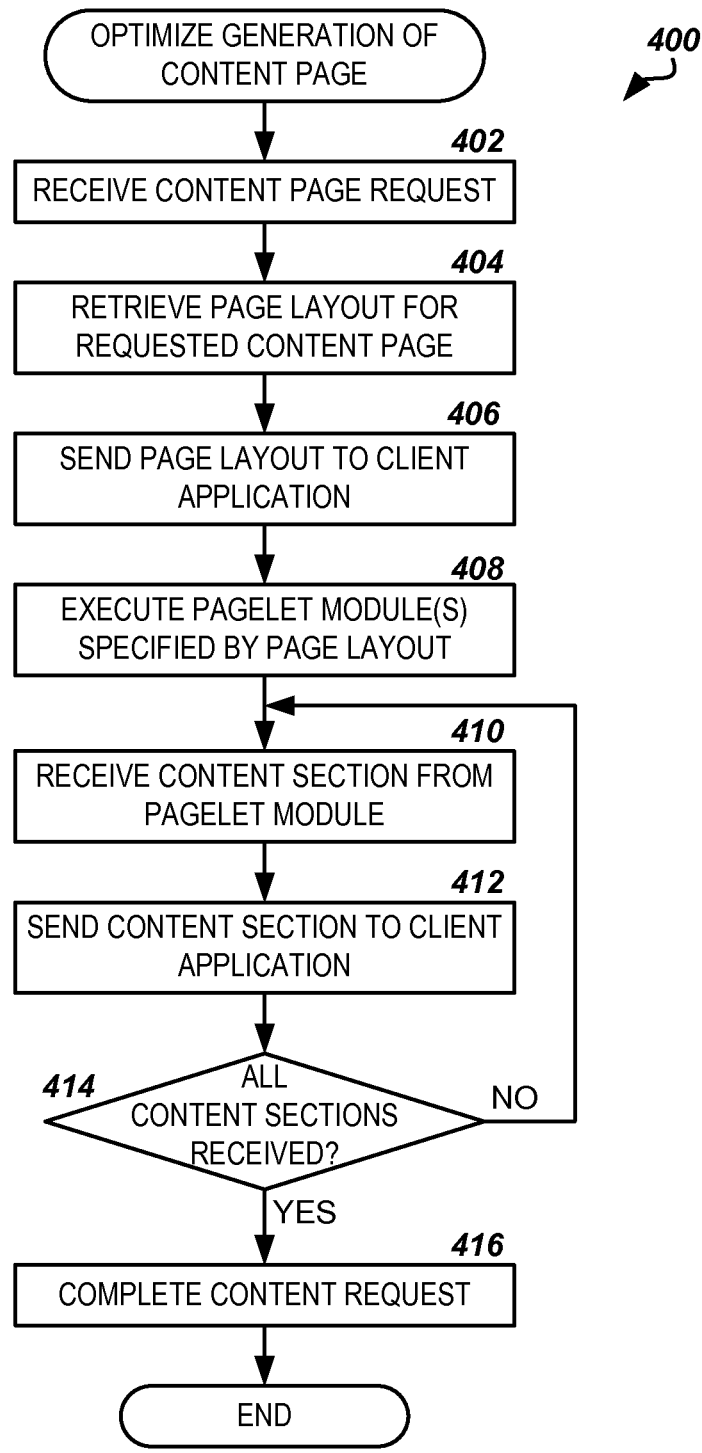
FIG. 4 is a flow diagram showing one method for optimizing page output by performing run-time reordering of the content of a page, according to embodiments described herein.

Turning now to FIG. 4, additional details will be provided regarding the embodiments presented herein for optimizing page output by performing run-time reordering of the content of a page. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic, and any combination thereof. It should also be appreciated that more or fewer operations may be performed than shown in the figures and described herein. These operations may also be performed in parallel, or in a different order than those described herein.

FIG. 4 illustrates a routine 400 for optimizing page output by transmitting content sections 132 for the requested content page 110 to the client application 108 in the order of completion of their generation, according to embodiments described herein. In one embodiment, the routine 400 is performed by the Web server 124, the page module 126 corresponding to the requested content page 110, and the associated pagelet modules 130, as described above in regard to FIG. 1. It will be appreciated that the routine 400 may also be performed by other modules or components executing on the application servers 122 in the content provider system 120, or by any combination of modules and components.

The routine 400 begins at operation 402, where the Web server 124 receives a request for a particular content page 110 from the client application 108. The requested content page 110 may be identified by a page address or uniform resource locator ("URL") specified in the request by the client application 108, for example. According to one embodiment, the Web server 124 utilizes the URL or other identifier of the requested content page 110 to determine a page module 126 to be utilized to compile the content for the page, as described above in regard to FIG. 1. The Web server then executes the page module 126 to generate the requested content page 110.

From operation 402, the routine 400 proceeds to operation 404, where the page module 126 retrieves the page layout 128 corresponding to requested content page 110, as further described above in regard to FIG. 1. The page layout 128 may consist of a file stored in a data storage facility in the content provider system 120 or a data object embedded in the page module 126, for example. The routine 400 then proceeds from operation 404 to operation 406, where the page module 126 sends the page layout 128 to the client application 108. This may be accomplished by placing the page layout 128 in the output stream established by the Web server 124 with the client application 108 in response to the request, for example. As described above, upon receiving the page layout 128, the client application 108 may render the content page 110 to the display 112 with the placeholder elements 302A-302H in place of the contents of the various layout sections 202A-202H.

From operation 406, the routine 400 proceeds to operation 408, where the page module 126 executes the pagelet modules 130 associated with the requested content page 110 to generate the content sections 132 corresponding to the layout sections 202A-202JH defined in the page layout 128. In one embodiment, all of the pagelet modules 130 associated with the content page 110 are executed simultaneously on parallel application threads. In another embodiment, the associated pagelet modules 130 are executed in a priority order defined for the content page 110. For example, the pagelet modules 130 generating content sections 132 corresponding to layout sections 202A, 202B, 202D, and 202F that are above the fold, as described above in regard to FIG. 2B, may be executed first or at a higher priority, with the remaining pagelet modules 130 executed subsequently or at a lower priority. It will be appreciated that other methods may be utilized by the page module 126 to determine the order and/or priority of execution of the pagelet modules 130 associated with the requested content page 110, including executing the pagelet modules in batches of a specific number, depending on resource availability in the content provider system 120.

The routine 400 proceeds from operation 408 to operation 410, where the page module 126 receives a generated content section 132 from one of the executed pagelet modules 130. The routine 400 then proceeds to operation 412, where the page module 126 sends the completed content section 132 to client application 108, by placing the content section into the output stream, for example. In one embodiment, the page module 126 also includes scripting-language code with the content section 132 for replacing the corresponding placeholder element 302A-302H defined in the page layout 128 with the contents of the completed content section, as described above in regard to FIG. 3A. Upon receiving the content section 132, the client application 108 renders the content section to the DOM and executes the scripting-language code to replace the corresponding placeholder element 302A-302H in the displayed content page 110 with the rendered contents from the content section.

From operation 412, the routine 400 proceeds to operation 414, where the page module 126 determines whether all content sections 132 corresponding to the layout sections 202A-202H defined in the page layout 128 for the requested content page 110 have been received from the associated pagelet modules 130. If all content sections 132 have not been received, the routine 400 returns to operation 410, where the page module 126 waits for the next completed content section. Once all the content sections 132 for the requested content page 110 have been received by the page module 126, the routine 400 proceeds from operation 414 to operation 416, where the page module completes the content request through the Web server 124. This may be accomplished by sending additional markup language signaling the end of the rendering of the content page 110 to the client application 108, as shown in FIG. 3B. From operation 416, the routine 400 ends.

In an alternative embodiment, upon determining that the client application 108 does not support the scripting-language code 304 utilized by the client application 108 to replace the placeholder elements 302A-302H with the contents of the corresponding content sections 132, the page module 126 may execute the pagelet modules 130 to generate the content sections in the order that the corresponding layout sections 202A-202H in the content page 110 are to be rendered by the client application 108. The page module 126 may then replace the placeholder elements 302A-302H in the page layout 128 with the content sections 132 as they are received from the pagelet modules 130 on the server. The sections of the content page 110 may then be placed into the output stream in the order of their rendering, allowing the client application 108 to render the content page in a traditional manner.

Figure 5:
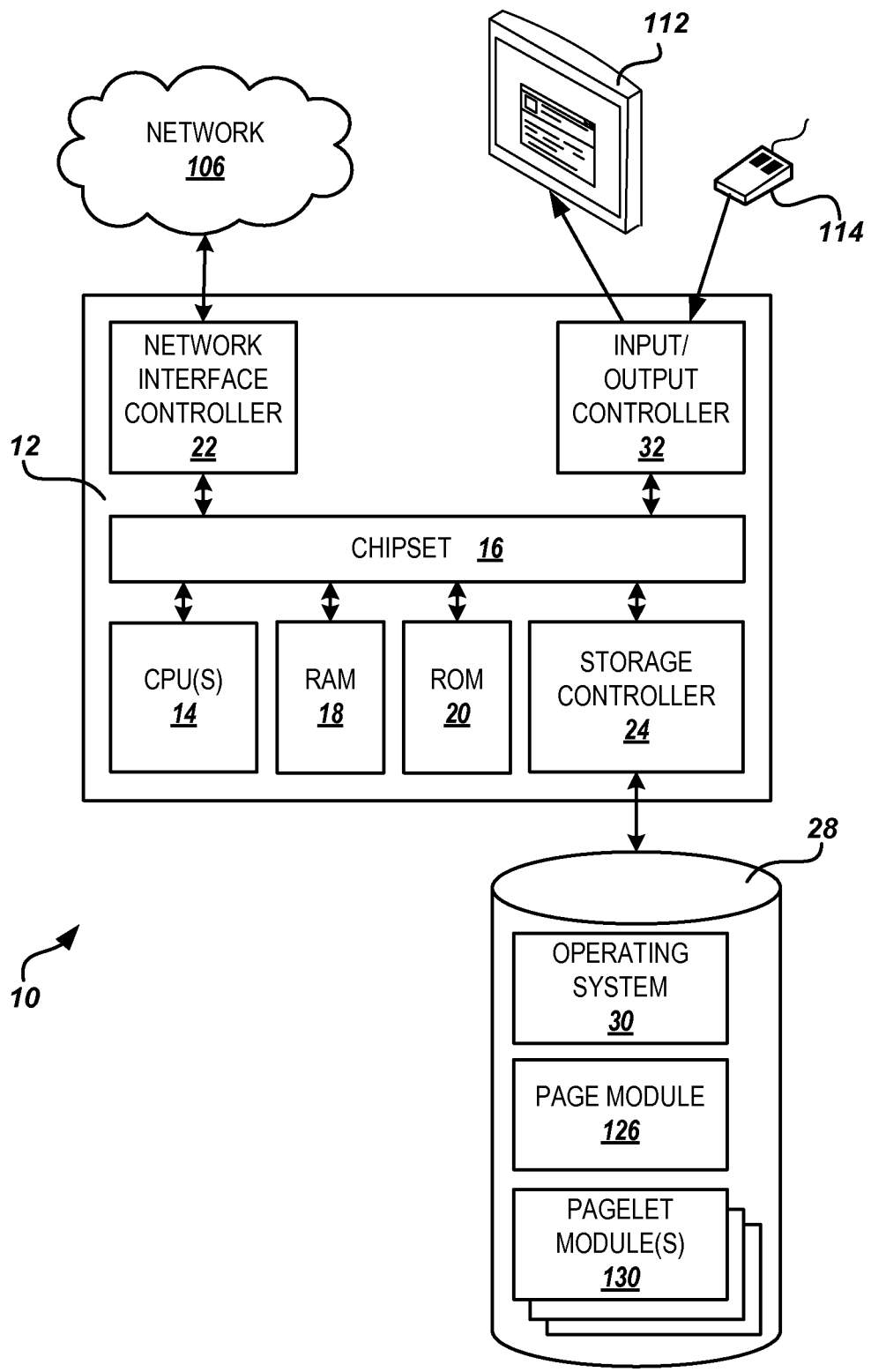
FIG. 5 is a computer architecture diagram showing an illustrative computer hardware architecture for computing devices described in embodiments presented herein.

FIG. 5 shows an example computer architecture 10 for a computer 12 capable of executing the software components described herein for optimizing page output by performing run-time reordering of the content of a page, in the manner presented above. The computer architecture 10 shown in FIG. 5 illustrates a conventional server computer, worksta-tion, desktop computer, laptop, network appliance, personal digital assistant ("PDA"), electronic book reader, digital cellular phone, or other computing device, and may be utilized to execute any aspects of the software components presented herein described as executing on the application servers 122, user computing device 104, or other computing platform.

The computer 12 includes a baseboard, or "motherboard," which is a printed circuit board to which a multitude of components or devices may be connected by way of a system bus or other electrical communication paths. In one illustrative embodiment, one or more central processing units ("CPUs") 14 operate in conjunction with a chipset 16. The CPUs 14 are standard programmable processors that perform arithmetic and logical operations necessary for the operation of the computer 12.

The CPUs 14 perform the necessary operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 16 provides an interface between the CPUs 14 and the remainder of the components and devices on the baseboard. The chipset 16 may provide an interface to a random access memory ("RAM") 18, used as the main memory in the computer 12. The chipset 16 may further provide an interface to a computer-readable storage medium such as a read-only memory ("ROM") 20 or non-volatile RAM ("NVRAM") for storing basic routines that that help to startup the computer 12 and to transfer information between the various components and devices. The ROM 20 or NVRAM may also store other software components necessary for the operation of the computer 12 in accordance with the embodiments described herein.

According to various embodiments, the computer 12 may operate in a networked environment using logical connections to remote computing devices and computer systems through the network 106, such as a local-area network ("LAN"), a wide-area network ("WAN"), the Internet, or any other networking topology known in the art that connects the computer 12 to remote computers. The chipset 16 includes functionality for providing network connectivity through a network interface controller ("NIC") 22, such as a gigabit Ethernet adapter. The NIC 22 is capable of connecting the computer 12 to other computing devices over the network 106, such as other application servers 122, the user computing device 104, a data storage system in the content provider system 120, and the like. It should be appreciated that any number of NICs 22 may be present in the computer 12, connecting the computer to other types of networks and remote computer systems.

The computer 12 may be connected to a mass storage device 28 that provides non-volatile storage for the computer. The mass storage device 28 may store system programs, application programs, other program modules, and data, which are described in greater detail herein. The mass storage device 28 may be connected to the computer 12 through a storage controller 24 connected to the chipset 16. The mass storage device 28 may consist of one or more physical storage units. The storage controller 24 may interface with the physical storage units through a serial attached SCSI ("SAS") interface, a serial advanced technology attachment ("SATA") interface, a fiber channel ("FC") interface, or other standard interface for physically connecting and transferring data between computers and physical storage devices.

The computer 12 may store data on the mass storage device 28 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 28 is characterized as primary or secondary storage, and the like. For example, the computer 12 may store information to the mass storage device 28 by issuing instructions through the storage controller 24 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 12 may further read information from the mass storage device 28 by detecting the physical states or characteristics of one or more particular locations within the physical storage units.

In addition to the mass storage device 28 described above, the computer 12 may have access to other computer-readable storage medium to store and retrieve information, such as program modules, data structures, or other data. It should be appreciated by those skilled in the art that computer-readable storage media can be any available non-transitory media that may be accessed by the computer 12. By way of example, and not limitation, computer-readable storage media may include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

The mass storage device 28 may store an operating system 30 utilized to control the operation of the computer 12. According to one embodiment, the operating system comprises the LINUX operating system. According to another embodiment, the operating system comprises the WINDOWS® SERVER operating system from MICROSOFT Corporation of Redmond, Wash. According to further embodiments, the operating system may comprise the UNIX or SOLARIS operating systems. It should be appreciated that other operating systems may also be utilized.

The mass storage device 28 may store other system or application programs and data utilized by the computer 12, such as the Web server 124, the page module 126, and the pagelet modules 130, each of which was described above in regard to FIG. 1. In one embodiment, the mass storage device 28 or other computer-readable storage media may be encoded with computer-executable instructions that, when loaded into the computer 12, may transform the computer from a general-purpose computing system into a special-purpose computer capable of implementing the embodiments described herein. These computer-executable instructions transform the computer 12 by specifying how the CPUs 14 transition between states, as described above. According to one embodiment, the computer 12 may have access to computer-readable storage media storing computer-executable instructions that, when executed by the computer, perform the routine 400 for optimizing page output by performing run-time reordering of the content of a page, as described above in regard to FIG. 4.

The computer 12 may also include an input/output controller 32 for receiving and processing input from a number of input devices, such as a keyboard, the mouse 114, a touchpad, a touch screen, an electronic stylus, or other type of input device. Similarly, the input/output controller 32 may provide output to a display 112, such as a computer monitor, a flat-panel display, a digital projector, a printer, a plotter, or other type of output device. It will be appreciated that the computer 12 may not include all of the components shown in FIG. 5, may include other components that are not explicitly shown in FIG. 5, or may utilize an architecture completely different than that shown in FIG. 5.

Based on the foregoing, it should be appreciated that technologies for optimizing page output by performing run-time reordering of the content of a page are presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the example embodiments and applications illustrated and described, and without departing from the true spirit and scope of the present invention, which is set forth in the following claims.

What is claimed is:

1. A method for optimizing generation and transmission of content in a content page, the method comprising executing instructions on one or more computers to perform the operations of:

receiving a request for the content page from a user computing device executing a client application;

transmitting a page layout exclusive of content sections as a first portion of an output file representing the content page to the user computing device, wherein the page layout comprises a plurality of placeholder elements arranged in a particular layout, individual ones of the plurality of placeholder elements corresponding to a content section for the content page;

executing a plurality of pagelet modules to generate the content sections in the content page, wherein the plurality of pagelet modules are executed in a priority order defined for the content page based on performance metrics collected from past renderings of the content page and based on whether the content section generated by the corresponding pagelet module will be shown in an initial display of the content page by the client application;

receiving the content sections from one of the plurality of pagelet modules; and transmitting the content section to the client application as a second portion of the output file representing the content page, wherein the content sections are transmitted to the client application in an order independent of the order of rendering the content sections by the client application in the content page.

2. The method of claim 1, wherein the content sections of the content page further comprise scripting-language code configured to cause the client application to call a function operative to replace child elements of the placeholder element in a document object model ("DOM") for the content page with elements comprising the corresponding content section.

3. The method of claim 2, wherein the placeholder element comprises a hyper-text markup language ("HTML") DIV tag.

4. The method of claim 1, wherein the client application executing on the user computing device is configured to render the content page to a display upon receiving the page layout, and to replace the corresponding layout section defined in the page layout with the content section as each content section is received.

5. The method of claim 1, wherein the client application executing on the user computing device is configured to render the content page to a display upon receiving the page layout, and to wait for multiple content sections to be received before replacing the corresponding placeholder elements in the page layout with the multiple content sections.

6. The method of claim 1, wherein the page layout further comprises first scripting-language code defining a function utilized by the client application to replace the placeholder elements with the corresponding content sections, and wherein one or more of the content sections further comprises second scripting-language code for executing the function contained in the first scripting-language code.

7. A computer-readable storage medium having computer-executable instructions stored thereon that, when executed by a computer, cause the computer to:

receive a request for a Web page from a user computing device;

retrieve a page layout corresponding to the Web page, wherein the page layout comprises hyper-text markup language ("HTML") defining one or more placeholder elements corresponding to layout sections arranged in the Web page, wherein the page layout is exclusive of content sections corresponding to the layout sections in the Web page;

transmit the page layout to the user computing device, wherein the page layout is rendered to a display by a client application executing on the user computing device upon receiving the page layout;

generate content sections corresponding to the layout sections in the Web page in a priority order defined for the Web page, the content section comprising HTML content for the corresponding layout section, wherein the priority order is determined based at least in part on whether the layout section corresponding to the content section will be shown by the client application in an initial display of the Web page; and transmit the content sections to the user computing device, wherein the client application executing on the user computing device waits for multiple content sections to be received before replacing the corresponding placeholder elements defined by the page layout for the layout sections with the multiple content sections.

8. The computer-readable storage medium of claim 7, wherein the content sections are transmitted to the user computing device in an order independent of the order of rendering by the client application of the corresponding layout sections in the Web page.

9. The computer-readable storage medium of claim 7, wherein the content sections are generated simultaneously on parallel application threads.

10. The computer-readable storage medium of claim 7, wherein the content sections further comprise scripting-language code operative to call a function to replace child elements of the placeholder element corresponding to the layout section in a document object model ("DOM") for the Web page with elements comprising the corresponding content section.

11. The computer-readable storage medium of claim 7, wherein the placeholder element corresponding to a layout section comprises an HTML DIV tag.

12. The method of claim 7, wherein the page layout further comprises first scripting-language code defining a function utilized by the client application to replace the placeholder elements with the corresponding content sections, and wherein one or more of the content sections further comprises second scripting-language code for executing the function contained in the first scripting-language code.

13. A system for optimizing generation and transmission of content in a content page, the system comprising:

one or more application servers connected to a user computing device executing a client application via a communications network;

a plurality of pagelet modules executing on the application servers configured to generate content sections for the content page; and a page module executing on the application servers and configured to transmit a page layout exclusive of the content sections to the client application as a first portion of an output file representing the content page, wherein the page layout comprises a plurality of placeholder elements arranged in a particular layout, individual ones of the plurality of placeholder elements corresponding to a content section for the content page, execute the plurality of pagelet modules to generate the content sections in the content page, wherein the plurality of pagelet modules are executed in a priority order defined for the content page based on performance metrics collected from past renderings of the content page and based on whether the content section generated by the corresponding pagelet module will be shown in an initial display of the content page by the client application, receive the content sections from the plurality of pagelet modules, and transmit the content sections to the client application over the communications network as a second portion of the output file representing the content page, wherein the content sections are transmitted to the client application in an order independent of the order of rendering the content sections by the client application in the content page.

14. The system of claim 13, wherein the client application executing on the user computing device is configured to render the content page to a display upon receiving the page layout, and to replace the corresponding placeholder elements in the page layout with the content section as each content section is received.

15. The system of claim 14, wherein the content sections further comprise scripting-language code configured to cause the client application to call a function operative to replace child elements of the corresponding placeholder element in a document object model ("DOM") for the content page with elements comprising the content section upon receiving the content section.

16. The system of claim 13, wherein the client application executing on the user computing device is configured to render the content page to a display upon receiving the page layout, and to wait for multiple content sections to be received before replacing the corresponding placeholder elements in the page layout with the multiple content sections.

17. The system of claim 13, wherein the page layout further comprises first scripting-language code defining a function utilized by the client application to replace the placeholder elements with the corresponding content sections, and wherein one or more of the content sections further comprises second scripting-language code for executing the function contained in the first scripting-language code.

18. The system of claim 13, wherein the placeholder element comprises a hyper-text markup language ("HTML") DIV tag.

19. A method for optimizing generation of content in a content page for transmission to a client application executing on a user computing device, the method comprising executing instructions on one or more computers to perform operations of:

receiving a request for a Web page from the user computing device;

retrieving a page layout corresponding to the Web page, wherein the page layout comprises hyper-text markup language ("HTML") defining a plurality of placeholder elements corresponding to layout sections arranged in the Web page, wherein the page layout is exclusive of content sections corresponding to the layout sections in the Web page;

transmitting the page layout to the user computing device, wherein the page layout is rendered to a display by the client application upon receiving the page layout;

generating content sections corresponding to the layout sections in the Web page in a priority order defined for the Web page, the content section comprising HTML content for the corresponding layout section, wherein the priority order is determined based at least in part on whether the layout section corresponding to the content section will be shown by the client application in an initial display of the Web page; and transmit the content sections to the client application wherein the client application waits for multiple content sections to be received before replacing the corresponding placeholder elements defined by the page layout for the layout sections with the multiple content sections.

20. The method of claim 19, wherein the content sections further comprise scripting-language code configured to cause the client application to call a function operative to replace child elements of the corresponding placeholder element in a document object model ("DOM") for the content page with elements comprising the content section upon receiving the content section.

21. The method of claim 19, wherein the page layout further comprises first scripting-language code defining a function utilized by the client application to replace the placeholder elements with the corresponding content sections, and wherein one or more of the content sections further comprises second scripting-language code for executing the function contained in the first scripting-language code.

22. The method of claim 19, wherein the content sections are received from the pagelet modules and transmitted to the user computing device in an order independent of the order of rendering of the corresponding layout sections defined in the page layout.

23. The method of claim 19, wherein the placeholder element comprises an HTML DIV tag.

* * * * *